3,194,829
CATALYTIC HYDRATION OF OLEFINS
Leslie D. Moore and Raymond C. Odioso, Glenshaw, Pa., assignors to Gulf Research & Development Company, Pittsburgh, Pa., a corporation of Delaware
No Drawing. Filed Dec. 12, 1960, Ser. No. 75,134
8 Claims. (Cl. 260—641)

This invention relates to the hydration of olefins in the presence of catalysts which are improved in hydration activity by pretreating with a gaseous sulfur containing compound. While this invention is particularly directed to hydration in the presence of improved silica-alumina catalysts it relates also to the use of other catalysts of this type such as silica-magnesia, silica-titania, silica-alumina-magnesia, silica-zirconia, silica-thoria, etc. The invention is particularly directed toward the use of hydrogen sulfide as a pretreating agent but other sulfur containing compounds which are gaseous and can decompose to hydrogen sulfide under pretreating conditions can be employed as, for example, propyl sulfide, propyl mercaptan, etc.

Silica-alumina composites are active catalysts for the hydration of olefins to corresponding alcohols. It has now been discovered that such catalytic composites are substantially enhanced in activity for the conversion of olefins to alcohols by pretreatment with hydrogen sulfide. That an increased catalytic activity is realized by the hydrogen sulfide pretreatment of this invention is especially surprising since no apparent reaction occurs between the silica-alumina and the hydrogen sulfide nor is there a deposition of sulfur upon the silica-alumina composite as a result of the pretreatment.

The hydrogen sulfide treatment must precede placing of the silica-alumina onstream in an olefin hydration process. Whereas treatment of the silica-alumina catalyst prior to its use substantially increases its activity for the hydraiton of olefins to alcohols, it has been found that no significant change in catalytic activity is realized when hydrogen sulfide is injected into a hydration reactor containing a non-pretreated silica-alumina catalyst being contacted with olefin and water reactants. Since it has been observed that in a pretreatment of silica-aluminas with hydrogen sulfide dispersion of the hydrogen sulfide in a gaseous diluent is advantageous and since, in a process for the hydration of an olefin to a corresponding alcohol, the olefin reactant is generally present in the reactor in primarily the gaseous phase, thereby simulating such a diluent, it appears that it is the fact that the catalyst is, during onstream treatment, disposed in the liquid water reactant that renders onstream treatment ineffective. It is therefore important that the hydrogen sulfide treatment of the silica-alumina occur prior to exposure of the catalyst to the liquid water reactant.

In employing the improved catalyst of this invention for the production of alcohols from olefins a wide range of reaction conditions can be employed. For example, hydration reaction temperatures of 250° F. to 700° F. are satisfactory with the preferable range being 350° F. to 650° F. A suitable pressure range for the hydration reaction is 400 to 10,000 pounds per square inch gauge or over with a preferred range of 1500 to 4000 pounds per square inch gauge. The molal ratio of water to olefin can vary from about 1:1 to 40:1 or more, and the preferred ratio is 5:1 to 20:1. The hydration process can be carried out in either batch or continuous operation but is preferably carried out in a continuous manner. The space velocity can vary from about 0.2 to 20.0 but is preferably 0.5 to 5.0 liquid volumes of olefin per hour per volume of catalyst, the actual space velocity used being a function of the olefin charged, the temperature used, etc.

The olefin is preferably reacted in the gaseous state. However, the reaction pressure should at least be sufficient to maintain a major portion of the water present in the liquid state, thereby favoring formation of the alcohol. Since water in the liquid state is employed, the water is preferably passed downflow over the catalyst at a rate such that the liquid cascades over the catalyst, covering it in a film-like manner as contrasted to submerging it, thereby promoting superior contact between catalyst, olefin and water.

The silica-alumina catalytic composites improved by the process of this invention include both natural and synthetic silica-aluminas, but use of the synthetic silica-aluminas is preferred. Synthetic silica-aluminas prepared by widely differing methods can be employed. For example, a silica-alumina prepared by mixing a solution of a silicate such as sodium silicate and an aluminum salt such as aluminum sulfate at the desired pH followed by washing and drying of the resulting precipitate is improved in hydration activity by hydrogen sulfide pretreatment.

Pure silicas and pure aluminas are generally unsatisfactory as catalytic materials to be employed in accordance with this invention. For example, the hydrogen sulfide treatment of non-catalytic quartz crystals did not impart catalytic activity to the material. The composites employed are silica-alumina composites containing between about 2 and 98 percent alumina by weight generally and preferably between about 7 and 60 percent alumina by weight, the remainder being silica. Preferably, the silica and alumina components are homogeneously distributed throughout the composite. The silica-alumina composites are substantially free of metals such as tungsten and molybdenum which are known to be catalytic activators even when present with silica-alumina to the extent of only about 5 percent by weight. Since such metal activators are chemically reactive with hydrogen sulfide their absence removes potential sites at which metal sulfides would be formed during the pretreatment whereas when the composite consists essentially of silica-alumina itself there is an absence of reactive sites at which a chemical combination of sulfur with the catalyst occurs. A surprising feature of this invention is that in spite of the absence of such reactive sites substantial catalytic activation is realized.

The charge olefins which are advantageously hydrated with the improved catalyst of this invention include those olefins which are effectively hydrated with non-pretreated silica-alumina catalysts. For example, $C_2$ to $C_5$ olefins are satisfactory charge materials while $C_3$ and $C_4$ olefins are the most satisfactory.

A wide range of pretreating conditions can be employed to effectuate in silica-alumina composites an enhanced catalytic activity for the hydration of olefins to corresponding alcohols. The preferred activating pretreating ingredient is hydrogen sulfide.

The silica-alumina catalyst can be contacted with substantially pure hydrogen sulfide or with hydrogen sulfide admixed with a gaseous diluent. Preferably, a diluent, such as hydrogen, is employed. Any other diluent which does not interact with the catalyst such as nitrogen, helium, neon, etc., could be employed. The proportion of hydrogen sulfide in admixture with diluent can vary widely and can range from as low as about 1 percent to nearly 100 percent hydrogen sulfide depending upon contacting duration, temperature, etc. Of the hydrogen-hydrogen sulfide mixtures those containing 1 to 80 percent hydrogen sulfide are preferred while those containing 5 to 25 percent hydrogen sulfide are most preferred. Pretreating temperatures can range from 100° F. to 2000° F., with a preferable range being 400° F. to 1000° F. Pretreating temperatures should not range above 2000° F. since sintering of the catalyst occurs at such elevated temperatures. Pressures can be atmospheric or above. Space velocities can range between about 10 and 2500 standard volumes of hydrogen sulfide per hour per volume of silica-alumina generally and preferably between about 50 and 200 standard volumes of hydrogen sulfide per hour per volume of catalyst. Treating durations can range between 10 minutes and 48 hours generally and preferably can range between 2 and 8 hours. The pretreating conditions of hydrogen sulfide concentration, space velocity and duration are adjusted so that the required total volume throughput of hydrogen sulfide per volume of catalyst is realized during pretreatment. Total throughput can range between 50 and 1500 standard volumes of hydrogen sulfide per volume of catalyst, generally, and preferably between 200 and 600 standard volumes of hydrogen sulfide per volume of catalyst.

Two series of hydration tests were conducted to illustrate the advantage of this invention. These tests are outlined in Table 1. In one series, silica-aluminas previously calcined at 1000° F. and in the form of 10–20 mesh granules were treated prior to use with a 92 percent hydrogen-8 percent hydrogen sulfide gas mixture for 4 hours at atmospheric pressure and 600° F., using a flow rate of 1135 standard volumes of gaseous mixture per hour per volume of catalyst. In the other series, constituting essentially blank tests, similar silica-aluminas were treated with 100 percent hydrogen at the same pretreating conditions so that the hydration conversion results permit a direct comparison of the effect of change of a single variable: substitution of a hydration sulfide containing pretreating mixture for hydrogen. In each of the hydration runs the reactants were passed downflow over the catalyst. The various silica-aluminas employed are commercial catalysts prepared by precipitation of a composite containing silica and alumina.

*Table 1.—Effect of hydrogen sulfide pretreatment on the activity of silica-alumina catalysts for the hydration of light olefins*

Hydration conditions:
3,675 pounds per square inch guage.
15:1 water:olefin molar ratio.
1 liquid volume of olefin per volume of catalyst per hour.

| Test | Catalyst, percent by weight | Catalyst pretreatment | Charge olefin | Reaction temperature, °F. | Product distribution, mole percent of feed converted to— | | | | Selectivity for alcohol, mole percent |
|---|---|---|---|---|---|---|---|---|---|
| | | | | | Alcohol | Ketone | Hydrocarbon | Total | |
| 1A | 5 silica-95 alumina | Hydrogen | Propylene | 420 | (¹) | (¹) | (¹) | 0.00 | -------- |
| | | | | 520 | 0.84 | 0.51 | (¹) | 1.28 | 66 |
| 1B | do | Hydrogen-hydrogen sulfide. | do | 420 | 0.17 | 0.17 | 0.48 | 1.34 | 13 |
| | | | | 520 | 1.61 | (¹) | (¹) | 2.97 | 35 |
| 2A | 85 silica-15 alumina | Hydrogen | do | 420 | 8.30 | 0.96 | (¹) | 9.26 | 90 |
| | | | | 520 | 42.79 | 0.31 | 0.38 | 43.48 | 99 |
| 2B | do | Hydrogen-hydrogen sulfide. | do | 420 | 12.38 | 0.10 | 0.07 | 14.27 | 87 |
| | | | | 520 | 45.10 | (¹) | 0.80 | 46.17 | 98 |
| 3A | 75 silica-25 alumina | Hydrogen | do | 420 | 6.22 | 0.05 | 0.48 | 6.75 | 92 |
| | | | | 520 | 41.83 | 0.24 | 0.62 | 42.69 | 98 |
| 3B | do | Hydrogen-hydrogen sulfide. | do | 420 | 24.32 | 0.22 | 0.41 | 25.33 | 96 |
| | | | | 520 | 43.76 | 0.23 | 1.03 | 45.72 | 96 |
| 4A | do | Hydrogen | n-Butene-2 | 420 | 15.3 | (¹) | (¹) | 15.5 | 99 |
| | | | | 520 | 20.4 | (¹) | (¹) | 21.1 | 97 |
| 4B | do | Hydrogen-hydrogen sulfide. | do | 420 | 23.2 | (¹) | (¹) | 23.4 | 99 |
| | | | | 520 | 29.6 | (¹) | (¹) | 43.7 | 68 |

¹ None detected in the product.

As shown in Table 1, even in the case of a very poor hydration catalyst the practice of this invention produces a small increase in catalytic activity. However, the more active hydration catalysts exhibit the greatest improvement by pretreatment in accordance with this invention. The 420° F. hydration data exhibits a greater improvement by the practice of this invention than the 520° F. data since the higher temperature yields are too close to equilibrium conversion levels for the most effective comparison of catalyst activity.

Further tests were conducted and tabulated in Table 2 to illustrate the non-equivalency of prior treatment of the catalyst with hydrogen sulfide and hydrogen sulfide treatment while the catalyst is onstream during a hydration process. The catalysts used in obtaining the data tabulated in Table 2 were pretreated with either hydrogen or a hydrogen-hydrogen sulfide mixture, as indicated, at 600° F. and atmospheric pressure for 4 hours using a flow rate of 1135 standard volumes of pretreating gas per volume of catalyst per hour.

*Table 2.—Comparison of the effects of hydrogen sulfide treatment of silica-alumina before and during olefin hydration*

Hydration conditions:
3,675 pounds per square inch gauge.
15:1 water: propylene molar ratio.
1 liquid volume of propylene per volume of catalyst per hour.

| Test | Catalyst-percent by weight | Catalyst pretreatment | 0.2 mole percent hydrogen sulfide in feed water | Charge olefin | Reaction temperature, °F. | Product distribution, mole percent of feed converted to— | |
|---|---|---|---|---|---|---|---|
| | | | | | | Alcohol | Other products |
| 1 | 85 silica-15 alumina | Hydrogen | No | Propylene | 420 | 8.3 | 1.0 |
| 2 | do | do | Yes | do | 420 | 10.0 | 0.5 |
| 3 | do | do | No | do | 520 | 42.6 | 1.1 |
| 4 | do | do | Yes | do | 520 | 38.2 | 0.4 |
| 5 | 75 silica-25 alumina | do | No | do | 420 | 6.3 | 0.7 |
| 6 | do | 92 percent hydrogen-8 percent hydrogen sulfide. | Yes | do | 420 | 23.7 | 1.2 |
| 7 | do | Hydrogen | No | do | 520 | 41.7 | 1.0 |
| 8 | do | 92 percent hydrogen-8 percent hydrogen sulfide. | Yes | do | 520 | 44.7 | 1.8 |

It is noted that in evaluation of data from Tests 1 to 4 small differences in results of tests made at a constant temperature are evidently due to experimental scatter. However, the fourfold improvement realized in Test 6 as compared to Test 5 is of such a considerable magnitude so as to be obviously due to catalyst pretreatment. The relatively small improvement realized by employing the pretreated catalyst in Test 8 as compared to the non-pretreated catalyst of Test 7 is explainable since the reaction temperature employed in Tests 7 and 8 is too close to the equilibrium temperature of the reaction to permit effective comparison of catalyst activity.

The data presented in Table 2 show that the presence of hydrogen sulfide in the reaction stream has substantially no catalytic effect. The data show that where a catalyst has not been treated with hydrogen sulfide prior to being placed onstream the presence of hydrogen sulfide during the reaction is substantially ineffectual. Also, by comparison with the data of Table 1, it is seen that for a catalyst pretreated with hydrogen sulfide, substantially no further improvement in catalytic activity is achieved by injecting hydrogen sulfide into the feed water.

The improved catalyst of this invention can be employed onstream for long periods without severe deactivation. For example, catalysts pretreated in accordance with this invention have been onstream for at least 40 hours without becoming deactivated to the activity level of a non-pretreated catalyst.

Various changes and modifications may be made without departing from the spirit of this invention and the scope thereof as defined in the following claims.

We claim:

1. A process for the catalytic hydration of olefin to alcohol comprising contacting a $C_2$ to $C_5$ olefin with water in the presence of a silica-alumina hydration catalyst at a temperature between about 250° F. and 700° F. and a pressure between about 400 and 10,000 pounds per square inch, said silica-alumina hydration catalyst having been pretreated by contacting hydrogen sulfide with said silica-alumina catalyst at a temperature between about 100° F. and 2000° F., said silica-alumina catalyst substantially free of catalytic activator metals which form metal sulfides under pretreating conditions, there being substantially no reaction between the hydrogen sulfide and the silica-alumina catalyst and substantially no deposition of sulfur upon the silica-alumina catalyst as a result of said pretreatment, said pretreatment increasing the activity of said catalyst for olefin hydration.

2. The process of claim 1 wherein said silica-alumina catalyst contains between about 2 and 98 percent by weight of alumina, the remainder being silica.

3. The process of claim 1 wherein said silica-alumina catalyst contains between about 7 and 60 percent by weight of alumina, the remainder being silica.

4. The process for the catalytic hydration of olefin to alcohol comprising contacting a $C_2$ to $C_5$ olefin with water in the presence of a silica-alumina hydration catalyst at a temperature between about 250° F. and 700° F. and a pressure between about 400 and 10,000 pounds per square inch, said silica-alumina hydration catalyst having been pretreated by contacting a gaseous mixture containing hydrogen sulfide with said silica-alumina catalyst at a temperature between about 100° F. and 2000° F., said silica-alumina catalyst substantially free of catalytic activator metals which form metal sulfides under pretreating conditions, there being substantially no reaction between the hydrogen sulfide and the silica-alumina catalyst and substantially no deposition of sulfur upon the silica-alumina catalyst as a result of said pretreatment, said pretreatment increasing the activity of said catalyst for olefin hydration.

5. The process of claim 4 wherein said gaseous mixture contains hydrogen in addition to hydrogen sulfide.

6. The process of claim 4 wherein said gaseous mixture contains between about 1 and 80 percent hydrogen sulfide, the remainder being hydrogen.

7. The process of claim 4 wherein said gaseous mixture contains between about 5 and 25 percent hydrogen sulfide, the remainder being hydrogen.

8. A process for the catalytic hydration of olefin to alcohol comprising contacting a $C_2$ to $C_5$ olefin with water in the presence of a hydration catalyst consisting of silica-alumina at a temperature between about 250° F. and 700° F. and a pressure between about 400 and 10,000 pounds per square inch, said silica-alumina hydration catalyst having been pretreated by contacting hydrogen sulfide with said silica-alumina catalyst at a temperature between about 100° F. and 2000° F., there being substantially no reaction between the hydrogen sulfide and the silica-alumina catalyst and substantially no deposition of sulfur upon the silica-alumina catalyst as a result of said pretreatment, said pretreatment increasing the activity of said catalyst for olefin hydration.

References Cited by the Examiner
UNITED STATES PATENTS

| | | | |
|---|---|---|---|
| 2,150,923 | 3/39 | Houndry | 252—411 |
| 2,663,744 | 12/53 | Lukasiewcz et al. | 260—641 |
| 3,006,970 | 10/61 | Beuther et al. | 260—641 |

LEON ZITVER, *Primary Examiner.*